Figure 1:
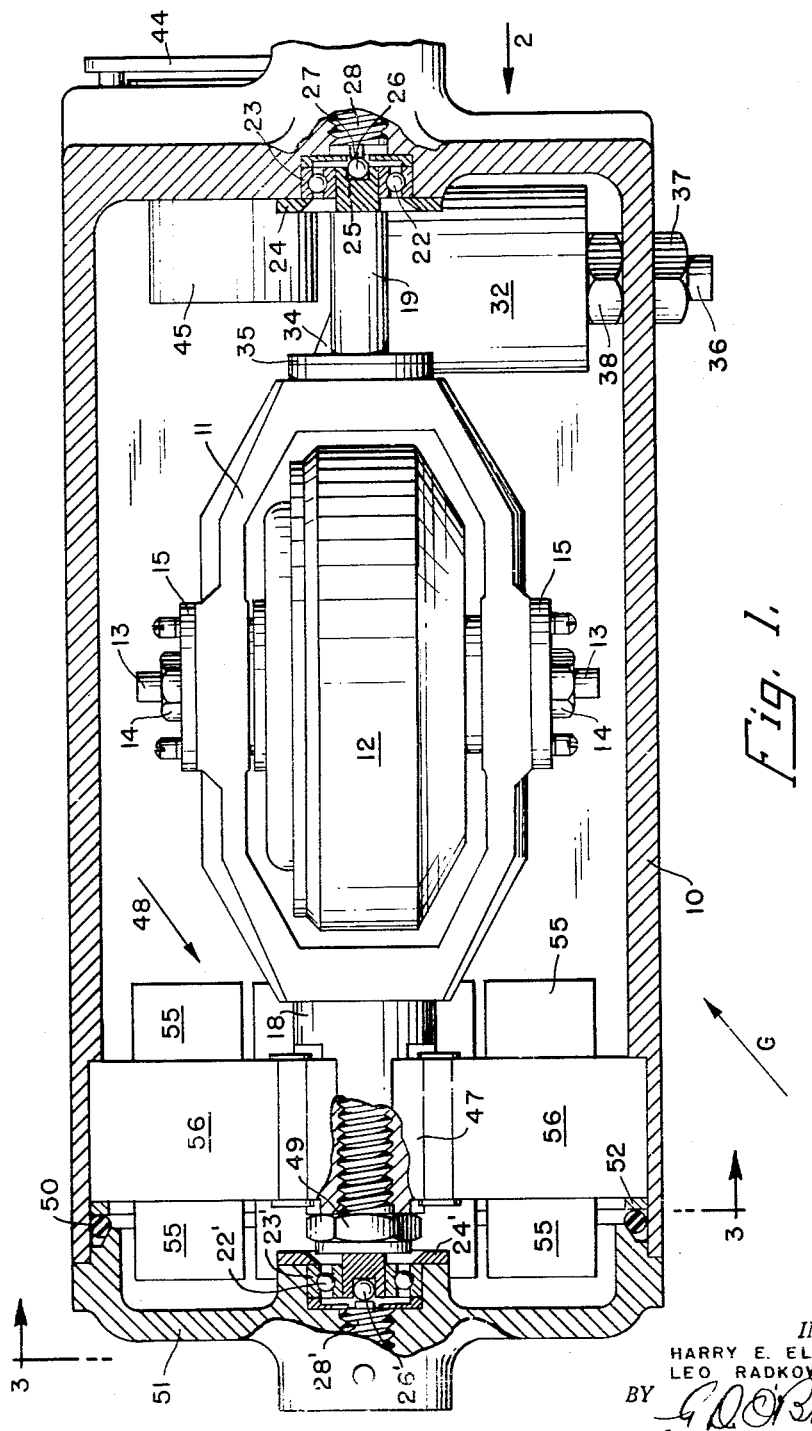

Oct. 18, 1960    H. E. ELLERMAN, JR., ET AL    2,956,436
RATE GYROSCOPE

Filed May 28, 1953    3 Sheets-Sheet 1

INVENTORS
HARRY E. ELLERMAN, JR.
LEO RADKOWSKI
BY
ATTORNEYS

INVENTORS
HARRY E. ELLERMAN, JR.
LEO RADKOWSKI
BY
ATTORNEYS

United States Patent Office 2,956,436
Patented Oct. 18, 1960

2,956,436

RATE GYROSCOPE

Harry E. Ellerman, Jr., and Leo Radkowski, Sharon, Pa., assignors, by mesne assignments, to the United States of America as represented by the Secretary of the Navy Filed May 28, 1953, Ser. No. 358,166

1 Claim. (Cl. 74—5.6)

This invention relates to improvements in a rate gyroscope wherein an electrical signal is provided which is proportional to the angular velocity of a body in one particular plane measured relative to the gyro as a reference.

The gyroscope assembly may have various applications; however, one very useful application has been in the control of torpedoes, this control involving the torpedo running depth, the roll of the torpedo and the control of the torpedo course in azimuth. In utilizing the invention in the control of torpedoes one of the units of the invention is utilized for each of the control functions just enumerated.

The gyroscope assembly of this invention utilizes a restraining spring to restrain its relative movement and an air dash-pot to dampen the movements and thereby prevent undesired oscillation. The more particular improvements involved in the inventions are a reluctance type signal pick-off whereby an electrical signal is derived from the assembly which is proportional to the angular velocity to be measured in one particular plane, as referred to above. The improved pick-off is particularly effective, accurate and involves no physical connections to the gyroscope itself. The pick-off involves a particularly shaped synchro rotor carried by one of the gimbal shafts of the gimbal assembly which moves adjacent the poles of a group of synchros angularly arranged around the shaft adjacent the synchro rotor. The synchros in themselves may be of conventional type and the electrical signal is derived giving an indication of the rate of relative movement of the gimbal to its mountings by virtue of the position of the synchro rotor relative to adjacent poles of the synchros. The signal voltage of the secondaries of the synchros is dependent on the reluctance in the gaps between the synchro poles and the synchro rotor. The rate at which the synchro rotor is moving relative to the synchro poles establishes a similar rate at which the magnetic flux in the magnetic circuit of the synchros changes and accordingly the signal from the synchros is an indication of the angular rate of the gyro.

A primary object of the invention is to provide an improved rate gyro having a reluctance type pick-off wherein the rate is determined in accordance with the movement of a rotor moving adjacent the poles of a group of synchros.

A further object is to provide an improved rate gyro as in the foregonig wherein a plurality of series connected synchros are provided cooperating with a synchro rotor having opposite concave sides and opposite convex sides.

Another object of the invention is to provide a generally improved rate gyro operative to give an electrical signal and otherwise improved in its accuracy, effectiveness and dependability.

Figure 2:
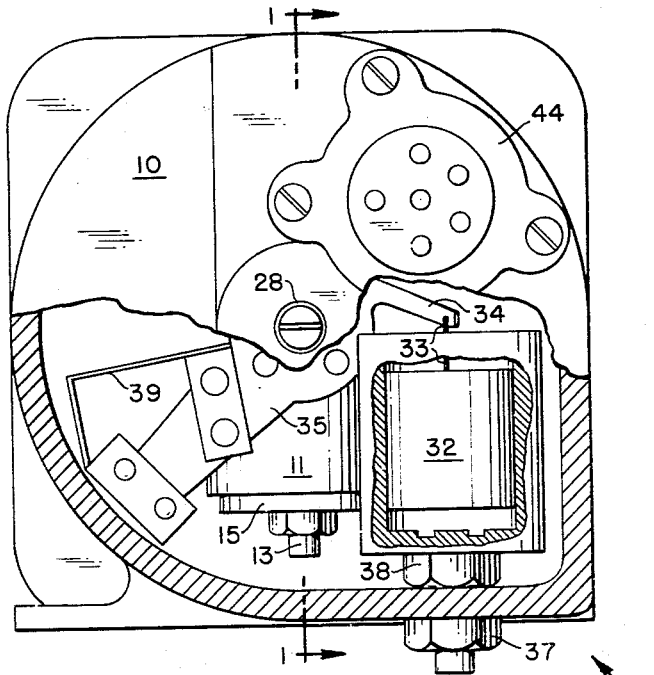
Figure 3:
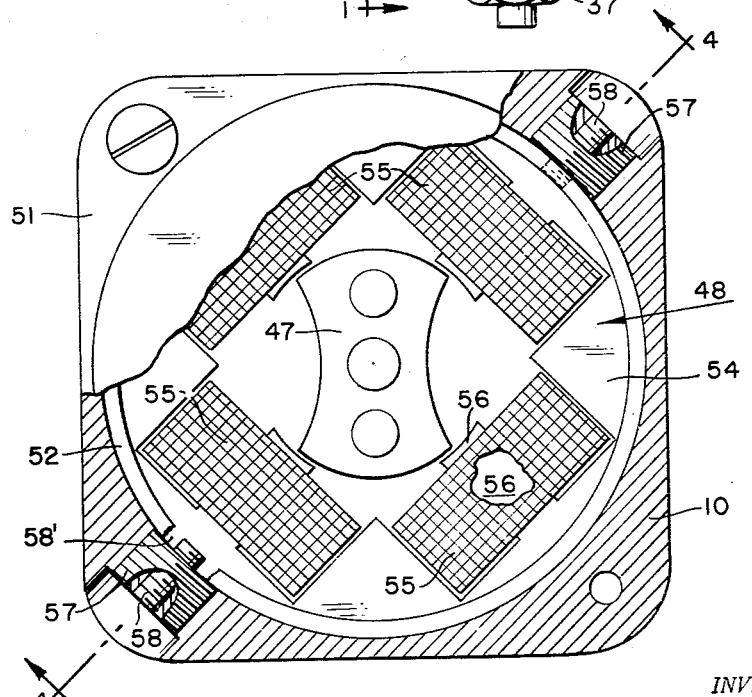
Figure 4:
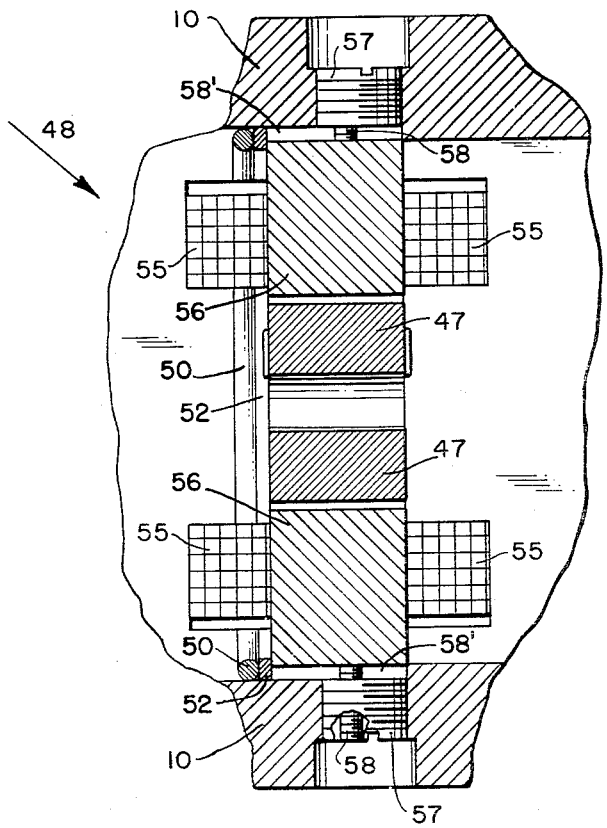

Further objects and numerous advantages of the invention will become apparent from the following detailed description and annexed drawings wherein:

Fig. 1 is a longitudinal section of one form of the invention taken on line 1—1, Fig. 2, portions being broken away, Fig. 2 is a partial end elevation as viewed in the direction of arrow 2, Fig. 1, portions being shown in section and other portions being broken away, Fig. 3 is an end elevation and section taken on line 3—3, Fig. 1, portions being broken away; and Fig. 4 is a section taken on line 4—4, Fig. 3, portions being broken away.

Referring now to the drawings, letter G designates the rate gyro assembly in its casing or housing 10. The casing has mountings in its ends, as will be described, for a single degree of freedom, a gimbal having a rotor 12 therein mounted on a shaft, the ends of which are mounted in bearings in the gimbal 11. The shaft is indicated at 13 journalled in bearings in gimbal 11 and secured by nuts 14 as shown, the bearings being secured in their housings by plates attached by screws as shown at 15. The gyro rotor may be of various different types and may be driven in various known manners. In the particular embodiment disclosed, however, the rotor is electrically drven and the drive motor may be of various types know in the prior art.

The dash-pot assembly is at the right end of the gimbal as shown in Fig. 1 and the reluctance pick-off is at the other end.

The gimbal 11 has oppositely extending gimbal shafts 18 and 19. The end of the shaft 19 is smaller in diameter and is journalled in a ball bearing 22, carried in a counterbore or recess 23 in the casing 10. The bearing 22 is secured in place by a bearing clamp 24. The end of the shaft 19 is recessed as shown at 25 and disposed in this recess is a ball 26 which bears against the tip 27 of a set screw 28 in the casing 10 which forms an adjustment for the gyro gimbal axis to adjust it for eliminating friction and to control end play.

The gimbal shaft 18 at the other end or side of the gimbal extends through the pick-off assembly and engages a similar bearing assembly at the other end of the casing 10 having parts 22', 23', 24', 26', 28', corresponding to those just described.

The dash-pot assembly includes a dash-pot cylinder 32 having a piston therein as is conventional in dash-pots and the piston is connected by stem 33 to an arm 34 (see Fig. 2) which connects to the gimbal shaft 19. The dash-pot assembly may involve a conventional biasing spring including an extending stem 36 so that the dash-pot may be adjusted by means of nuts as shown at 37 and 38. The dash-pot arm 34 is a part of a bracket 35 attached to gimbal 11 and having an extending portion as shown in Fig. 2 which is engageable with a stop member 39.

The electrical connections to the gyro motor and the pick-off are made through a socket 44 and an internal plug 45.

The synchro rotor carried by the gimbal shaft 18 is shown at 47 and it operates within a group of four synchros 48 angularly arranged around the synchro rotor and shaft 18. The synchro rotor 47 is secured on the gimbal shaft by a nut 49. The end of the housing 10 is indicated at 51 and it is suitably secured to the housing 10 with an interposed gasket 50 abutting O-ring 52 to make the housing or casing completely dust tight.

Screw adjustments are provided as shown for adjusting the null point of the synchro assembly as well be described presently.

The pick-off assembly includes a stator having a shape as shown in Fig. 3 and indicated by numeral 54. Each synchro comprises a primary and secondary winding as indicated at 55, Figs. 3 and 4, and these windings are wound on poles as indicated at 56 of the stator 54. The stator has a central bore as shown in Fig. 3 and the poles 56 have concave inner surfaces conforming to the curvature of the convex faces of the rotor. The rotor 47, as may be seen in Fig. 3, has two opposite concave surfaces and two opposite convex surfaces which move closely adjacent the poles 56 of the synchros.

The synchro assembly can be adjusted externally of the casing 10 to adjust its null position. The provision for this adjustment is shown in Fig. 4. It will be seen that in opposite corners of the casing 10 there are provided tapped holes to receive set screws 57. In each of these set screws, extending through it is a smaller set screw 58, the end of which engages in a slot 58' in the stator 54. As best shown in Fig. 4, screw 58 is disposed eccentric to the axis of rotation of screw 57 and its inner end, which engages slot 58' forms an eccentric which will rotate stator 54 about the gimbal axis when screw 57 is rotated. After the stator is rotated to the null point, screw 58 may be further tightened, serving as a set screw to prevent loosening of screw 57. In making the adjustment, the opposed screw assemblies are, of course, simultaneously actuated as described. The null position referred to is one in which there would be a null, that is, there would be no signal from the synchros by virtue of the fact of there being no changing of the magnetic flux due to concave surfaces of the rotor passing adjacent certain poles of the synchros. When convex surfaces of the rotor are passing adjacent poles of the synchro, the reluctance is being changed and consequently the magnetic flux is being changed and the synchros give a response which is a rate signal proportional to the rate of relative movement of the gyro in its mountings.

The four synchros are of conventional type with their primaries connected in series to a source of power. The secondaries are also connected in series and they provide an electrical signal which, as described, is proportional to the rate of angular movement relatively of the gyro.

The electrical pick-off disclosed is extremely effective and accurate and requires no physical connection to the gimbal and, furthermore, provides for easy and accurate adjustment from outside of the casing.

The foregoing disclosure is representative of a preferred form of our invention. It is to be understood that the disclosure is to be interpreted in an illustrative rather than a limiting sense, the scope of the invention to be in accordance with the claim appended hereto.

What we claim is:

A rate gyro comprising; a closed casing, a gimbal of the single degree of freedom type disposed within the casing having axially aligned and oppositely extending supporting shafts carried thereby, ball bearings carried at opposite ends of the casing rotatably supporting the shafts, whereby the gimbal may rotate about only one axis, the outer remote ends of said shafts each being provided with a socket and a ball disposed in the socket, a pair of members, each threadedly engaging an opposite end of the casing and abutting a ball, said members being accessible from exterior of the casing for rotation of same, whereby rotation of same axially adjusts the position of the gimbal, a rotor rotatably carried by the gimbal for rotation about an axis perpendicular to the axis of rotation of the gimbal, a synchro rotor affixed to one of the shafts for rotation therewith, a synchro stator having a circular periphery carried within a bore in the casing for limited angular adjustment concentric with said first named axis, said stator having an outwardly open slot in its periphery extending in a direction substantially parallel with said first named axis, a rotatable member threadedly engaging the casing and accessible exterior thereof for rotation of same, said member, aforesaid, having an eccentric portion threadedly engaging same and extending into said slot, whereby rotation of said rotatable member may rotate the synchro rotor to a null point position and rotation of said eccentric portion may lock it thereat.

References Cited in the file of this patent

UNITED STATES PATENTS

| | | |
|---|---|---|
| 635,489 | Laschet | Oct. 24, 1899 |
| 1,122,213 | Mattman | Dec. 22, 1914 |
| 1,842,824 | Colvin et al. | Jan. 26, 1932 |
| 2,338,271 | Ulanet | Jan. 4, 1944 |
| 2,488,734 | Mueller | Nov. 22, 1949 |
| 2,591,697 | Hays | Apr. 8, 1952 |
| 2,752,790 | Draper | July 3, 1956 |